J. P. Owen.

Bedstead Fastening,

N° 6,944. Patented Dec. 11, 1849.

UNITED STATES PATENT OFFICE.

J. P. OWEN, OF NORWALK, OHIO.

BEDSTEAD-FASTENING.

Specification of Letters Patent No. 6,944, dated December 11, 1849.

*To all whom it may concern:*

Be it known that I, J. PARSONS OWEN, of Norwalk, in the conuty of Huron and State of Ohio, have invented certain new and useful Improvements in Bedstead-Fastenings, and that the following is a full, clear, and exact description of the principle or character which distinguishes them from all other things before known and of the usual manner of making, modifying, and using the same, reference being had to the accompanying drawing, in which—

Figure 3:
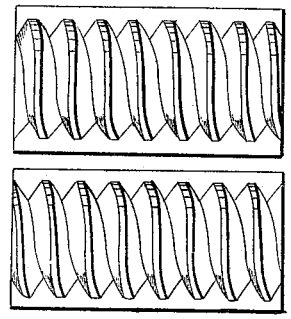
Figure 4:
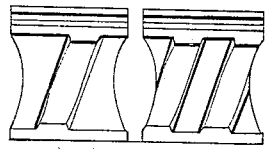
Figure 1:
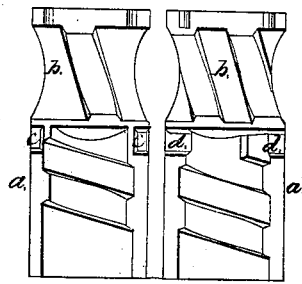
Figure 1:
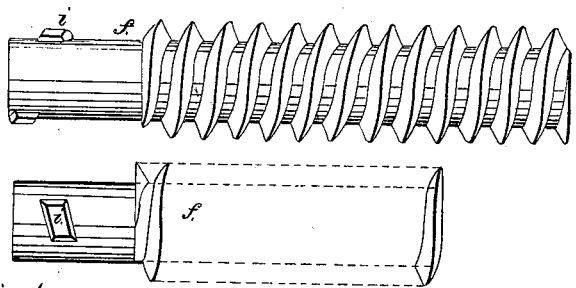
Figure 2:
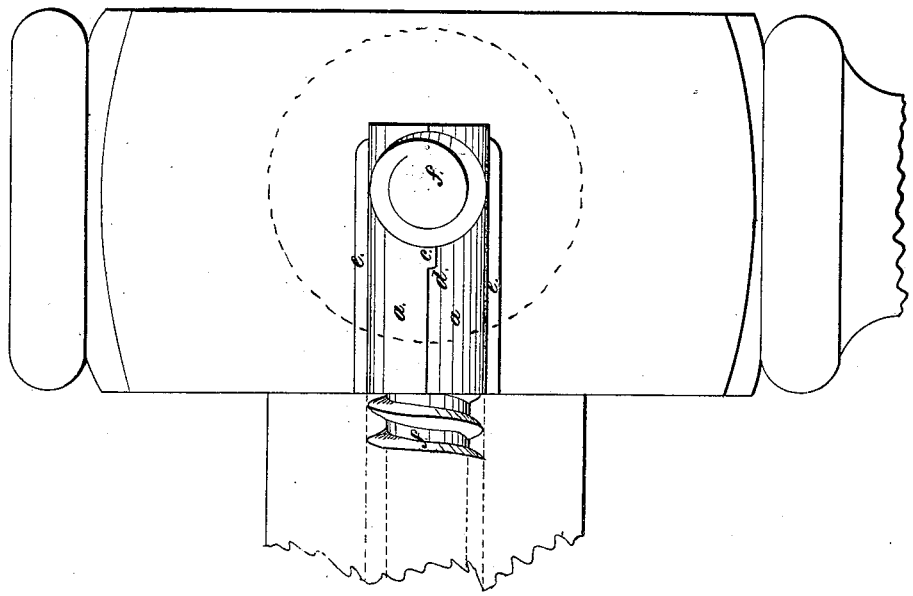

Figure 1, shows the parts detached; Fig. 2, the parts united; Fig. 3, box for inserting pins in the rails; Fig. 4, short nut.

The object of my improvement is so to form the parts of a bedstead fastening, as to facilitate their manufacture, and lessen the cost of production, by which a cheap, permanent, and useful fastening is made, that can be readily applied by any ordinary workman.

The construction is as follows: I form a cylinder, divided into two parts, as shown at (*a, a,*) Fig. 1; at one end of this cylinder a circular hole (*b,*) is made through it transversely, in which the thread of the screw is cut; the line dividing this cylinder passes through the diameter of the hole (*b,*) dividing it into two parts; the main body of the cylinder (*a,*) is hollow, with a screw thread cut in it, as clearly shown in Fig. 1; a small projection (*c,*) is formed on the line of junction of one of the semi-cylinders, which fits into a recess (*d,*) made to correspond with it in the other semi-cylinder; on the outside of each section there is a rib (*e,*) running the whole length of the cylinder to steady it when inserted in the bedpost; a hole is bored into the post the size of the cylinder, the two parts of which, fitted together, are driven into said hole; another hole is made in the post, at right angles to that above named, opposite to which the hole (*b,*) in the cylinder comes, when properly inserted; on each end of the rails a pin (*f,*) is inserted, by a screw, or other convenient mode; but I give the preference to the screw. In order to insert these pins in the proper position, I employ boxes, (see Fig. 3,) with a female screw cut therein to fit the thread of the pin, this I place upon the end of the rail in a given position over the hole made for the pin so as to cause it to enter the rail correctly; the box, as will be seen in the drawing, is made in two parts, like the cylinder (*a,*) before described; on that portion of the pin that projects beyond the end of the rail, there are two lugs (*i,*) cast, forming portions of the thread of a screw, that take into the threads of the female screws within the cylinder. The cylinder itself is retained in its position in the post by the pin that passes through the hole (*b,*) perpendicular to the axis of the cylinder; the parts being thus constructed and arranged, form a cheap and permanent bedstead-fastening, that is set up and taken down in the usual way. It is obvious that if but one pin is used, the cylinder may be made short, with the lateral hole only, as shown in Fig. 4.

Having thus fully described my improvements in bedstead fastening, what I claim therein as new, and for which I desire to secure Letters Patent is—

A bedstead fastening consisting of a box formed of two parts having screw threads therein and divided through the center longitudinally in the plane of the axis of said screws as described and represented, said parts being so formed by locks as when inserted into a bed post to have both parts firmly held in place against the force of the screw.

J. PARSONS OWEN.

Witnesses:
WM. GREENOUGH,
J. J. GREENOUGH.